United States Patent [19]

Kendall et al.

[11] Patent Number: 4,832,288
[45] Date of Patent: May 23, 1989

[54] RECOVERY SYSTEM

[75] Inventors: Robert T. Kendall, Palos Verdes Estates, Calif.; Robert T. Kendall, Jr., Grants Pass, Oreg.

[73] Assignee: Aerospace Recovery System, Inc., Grants Poss, Oreg.

[21] Appl. No.: 76,631

[22] Filed: Jul. 23, 1987

[51] Int. Cl.⁴ .................... B64G 1/58; B64G 1/62
[52] U.S. Cl. ................... 244/160; 244/138 R; 244/2; 244/113; 244/158 A; 244/3.24; 441/30
[58] Field of Search ............... 244/138 R, 2, 158 R, 244/160, 161, 113, 146, 905, 121, 163, 158 A, 3.24; 441/30; 102/386, 387, 405, 348

[56] References Cited

U.S. PATENT DOCUMENTS

| | | | |
|---|---|---|---|
| 1,308,375 | 7/1919 | Satup | 244/146 |
| 1,678,537 | 7/1928 | Schonbrun | 244/146 |
| 3,053,476 | 9/1962 | Mohar | 244/138 R |
| 3,286,951 | 11/1966 | Kendall | 244/138 R |
| 3,405,887 | 10/1968 | Mixsonr | 244/138 R |
| 3,433,435 | 3/1969 | Alai | 244/160 |
| 3,509,772 | 5/1970 | Blair | 441/30 |
| 3,547,376 | 8/1969 | Paine | 244/138 R |
| 3,604,667 | 9/1971 | Moraes | 244/160 |
| 3,679,025 | 7/1972 | Rummel | 244/905 |
| 3,712,417 | 1/1973 | Chacko et al. | 244/905 |
| 4,166,598 | 9/1979 | Seifeut et al. | 244/160 |
| 4,271,552 | 6/1981 | Sandler | 441/30 |
| 4,403,888 | 9/1983 | Teasdale | 441/30 |

Primary Examiner—Galen Barefoot
Attorney, Agent, or Firm—Diller, Ramik & Wight

[57] ABSTRACT

A recovery system for decelerating/stabilizing and protecting space vehicles, boosters, astronauts, equipment and like payloads, including a paracanopy defined by a frusto-conical flexible uninflated skin forming a decelerator/stabilizer surface having a small inflated torus at it leading end and a larger trailing torus at its trailing end with an inflated annular protective sheath therebetween protecting the payload housed therein, duct means between the toruses and the annular sheath for forming a fluidically rigidified frame, and the fluidically rigidified frame maintaining the flexible skin in taut though uninflated condition during entry and recovery, The paracanopy further can include an inflated buoyant section for recovery at sea, and depending upon the payload to be recovered, the paracanopy can be deployed as a single structure from one end of the payload or from opposite ends of the payload as two separate cooperative structures. The paracanopy/recovery structure can also include an inflated attenuator for absorbing ground impact forces.

70 Claims, 8 Drawing Sheets

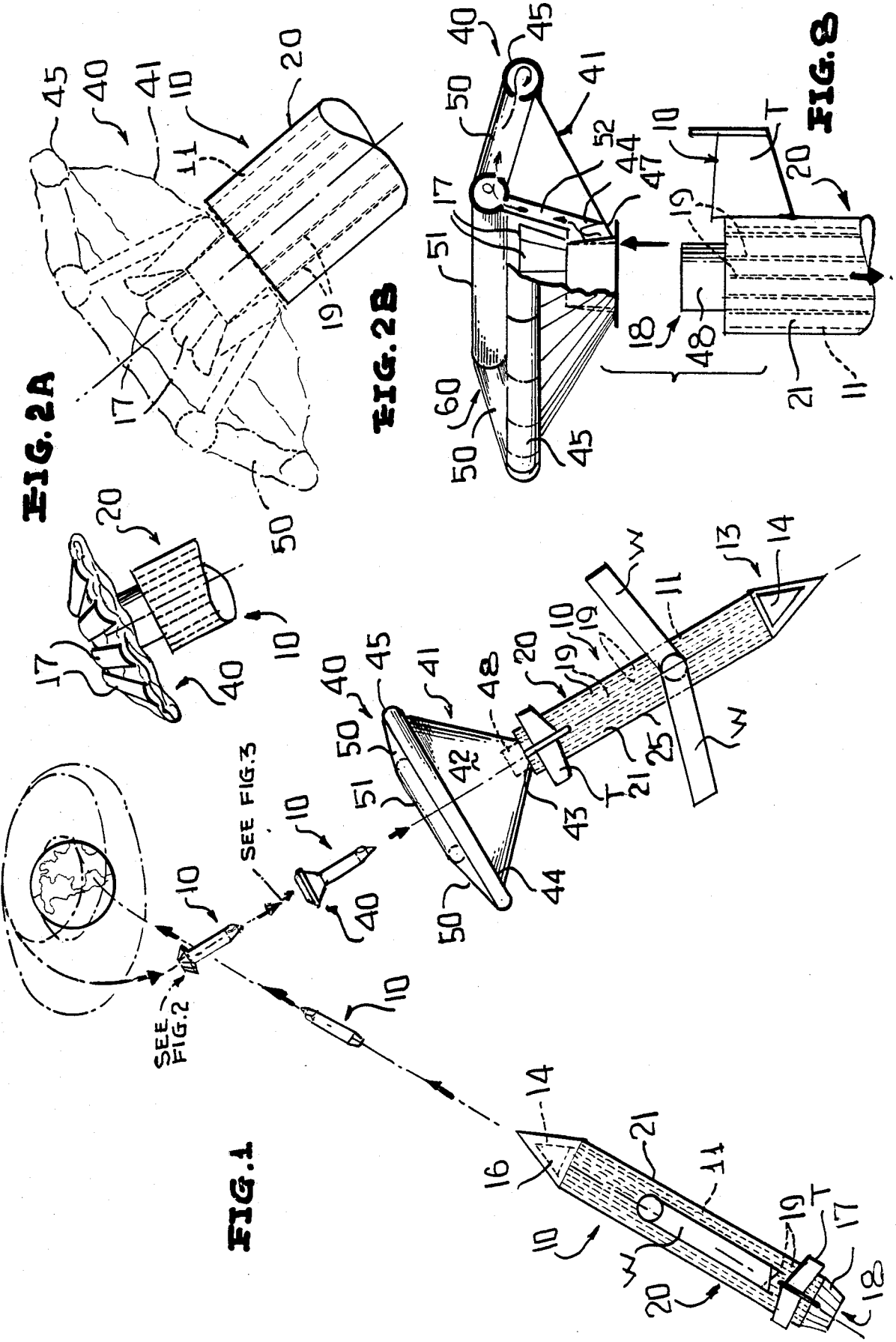

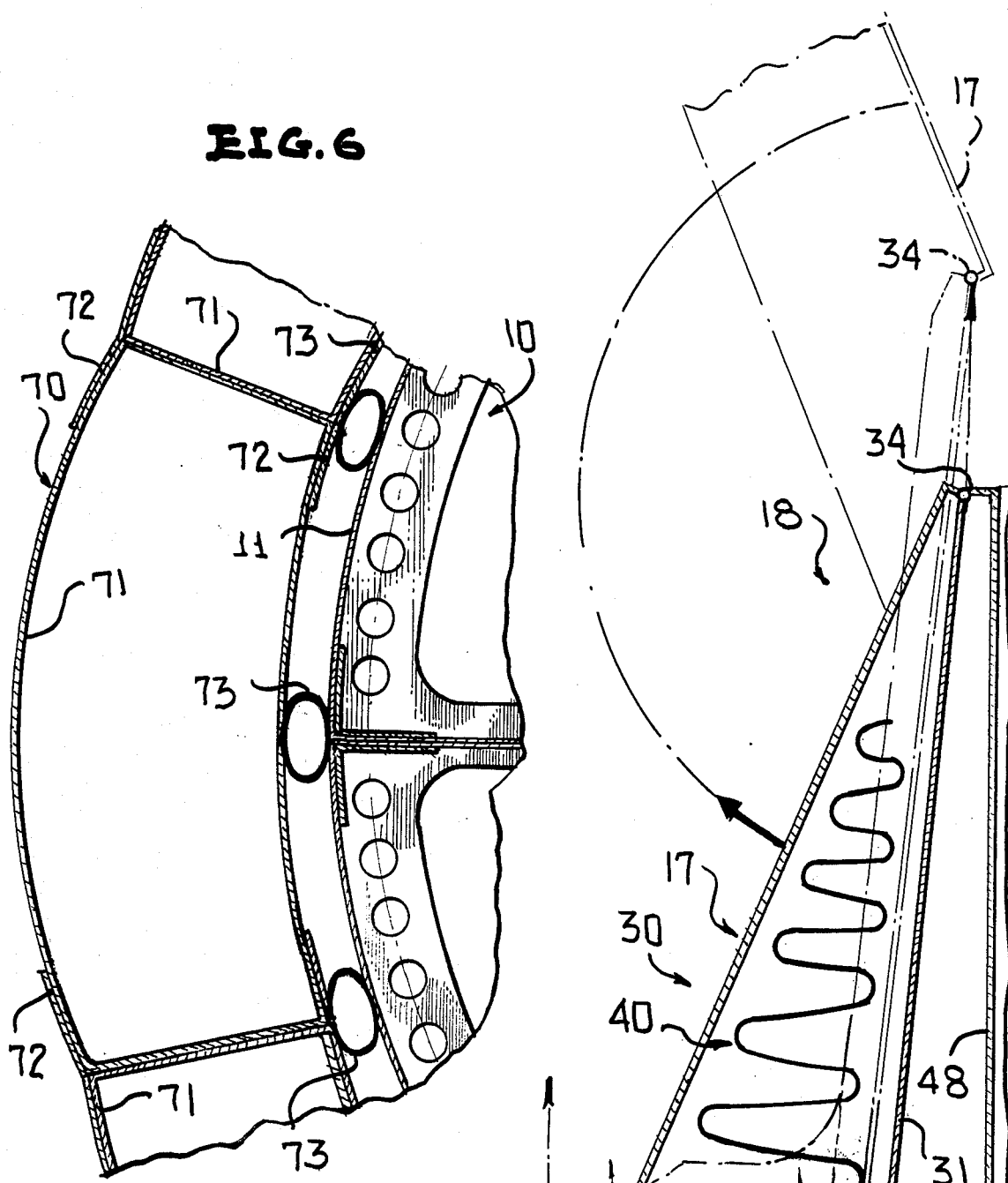

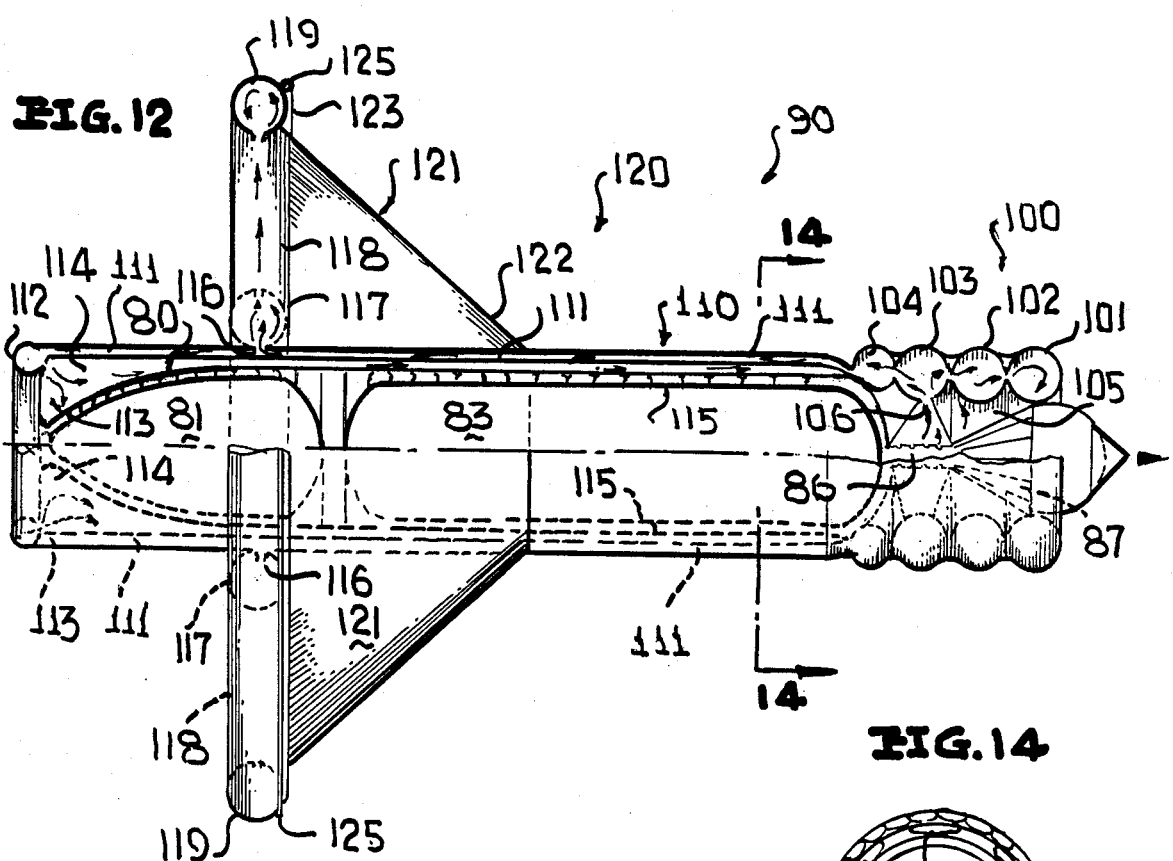
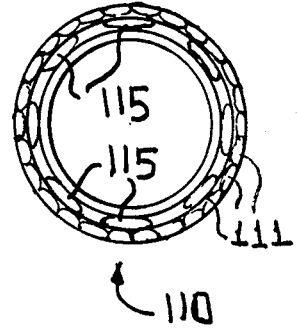
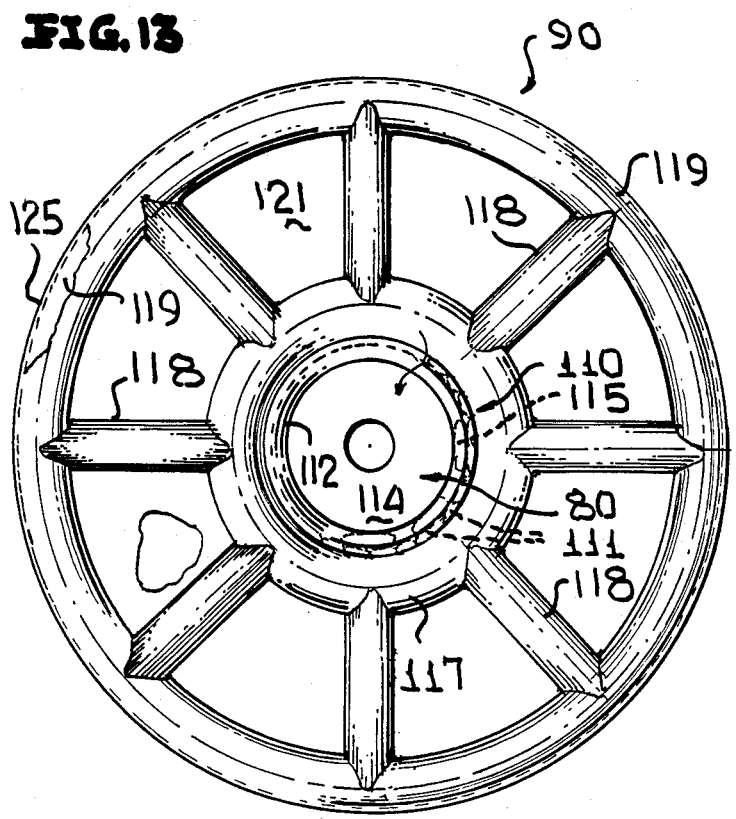
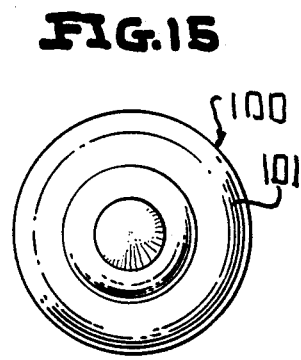

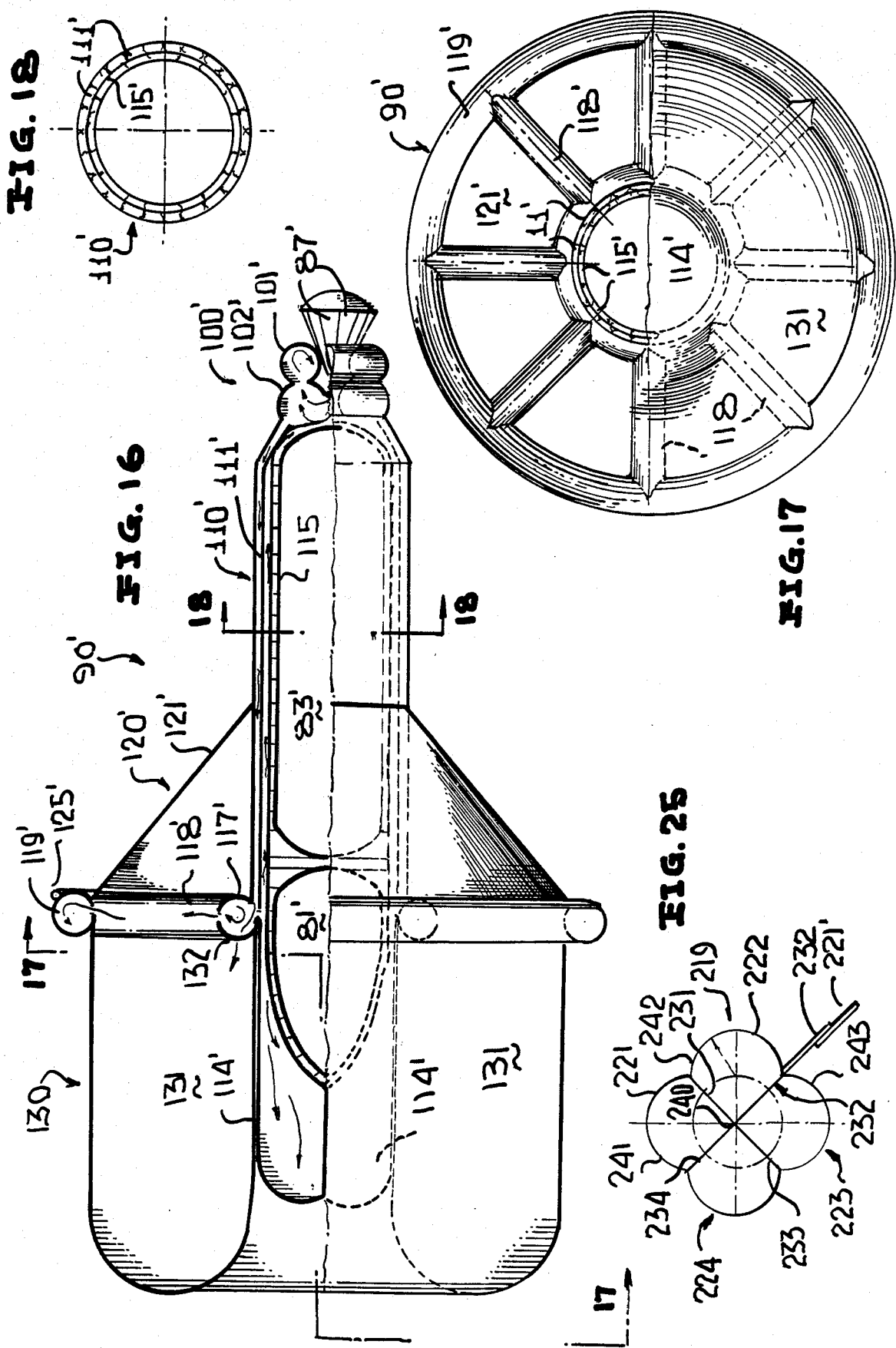

RECOVERY SYSTEM

BACKGROUND OF THE INVENTION

The invention is directed to an improvement for recovering objects from great distances above the earth's surface and landing them safely onto the earth, and constitutes an improvement of the Recovery System of the patentee disclosed in U.S. Pat. No. 3,286,951 granted Nov. 22, 1966.

The latter patent discloses a rocket booster recovery system which includes an inflatable heat shield having a blunt-nosed cone for protecting recovered objects against heat developed during descent/reentry and a toroidal gas bag for reducing the rate of descent. The object to be recovered, such as a spent or used rocket booster, is supported within the heat shield portion with its aft end resting against the nose portion of the heat shield and its cylindrical side wall is supported by a radially inner portion of the toroidal gas bag. Support webs or straps connect the torodial gas bag to the rocket booster and to the inflatable heat shield. The inflatable heat shield is fabricated from high temperature resistant fabric, such a stainless steel wire coated with a silicone elastomer to make it gas-tight, and when inflated the cone shape defines a large area and volume which correspondingly creates undesired weight. Thus, when stowed in the booster, the heat shield uses space and which might otherwise accommodate added fuel and/or could be used to lighten overall weight. When deployed the inflatable heat shield both decelerates/-stabilizers and protects the booster from heat during reentry, but does so at the added cost of the double skin (double weight) of the inflated gas bag. Obviously, less weight involved in a recovery system means less cost for both launch and recovery, and no one, other than applicant, has heretofore balanced the conflicting factors of low weight and low costs on the one hand with high protection and efficient vehicle deceleration/-stabilization on the other.

Another recovery system involving the disadvantages heretofore noted is essentially the extremely large inflated toroidal bag disclosed in U.S. Pat. No. 4,518,137 in the name of Dana G. Andrews dated May 21, 1985. The toroidal bag is not only extremely large but is also completely covered by a cloth cover which adds to the weight and, of course, to the costs of atmospheric/orbital launch, entry and/or reentry. Larger weight and mass of a recovery system equate to higher velocity upon reentry, and prior art recovery systems of large size, though effective, are highly prohibitive from a cost standpoint.

Recognizing the shortcomings of the recovery system disclosed in U.S. Pat. No. 3,286,951, the assignee thereof at one time investigated the suitability of utilizing a so-called drag cone (power cone) in conjunction with the recovery system of the latter-noted patent as part of a concept called "ROOST" —Reusable Orbital One-Stage Space Truck. This concept, though practical, never materialized beyond utilizing the "Paracone" as a replacement for the parachute, as set forth in Douglas Paper 1902 prepared by applicant on behalf of Douglas Aircraft, Inc., which was presented at a symposium of the Department of Defense Joint Parachute Test Facility in El Centro, California Apr. 7—9, 1964. A similar paper involving paracones was prepared by Applicant on behalf of Douglas Aircraft Co., Missles and Space Division, published April 1970, entitled The Paracone Airborne Drop and identified as MDAC PAPER WD1286. The contents of these paper/reports are incorporated herein by this specific reference.

SUMMARY OF THE INVENTION

The present invention provides a novel "paracanopy" forming part of a recovery system for space vehicles, such as space shuttles, boosters and the like, which is relatively lightweight thereby appreciably lessening the costs of vehicle launch, yet when deployed in its particular shape, the volume and area provided is appreciably large to both maximize deceleration and stabilization because of an annular protective sheath encompassing the reentry object, the latter is protected against damage.

In accordance with this invention, the paracanopy is preferably constructed as a frusto-conical flexible uniflated skin defining a decelerator/stabilizing surface between relatively axially spaced leading and trailing end portions, the leading end portion being of a smaller diameter than the trailing end portion, an inflatable torus at the trailing end portion, an inflatable annular protective sheath at least partially disposed within the frusto-conical skin, the annnular sheath being adapted to intimately surround at least a portion of an object-/payload housed therein, duct means between the torus and the annular protective sheath for defining upon inflation thereof a fluidically rigidified frame, and means for inflating the torus, annular protective sheath and duct means incident to vehicle reentry to fluidically rigidify the frame thereby maintaining the flexible skin in taut, though uninflated, condition and in progressively spaced relationship from the annular sheath wherey deceleration and stabilization is provided by the decelerator surface and protection to the payload is effected by the protective sheath.

In further accordance with this invention, the paracanopy can also be utilized as part of an overall recovery system which also includes an inflated shock attentuator carried by the leading end portion of the protective sheath to protect the payload/object and an inflated buoyant member at the trailing end of the payload/object to permit effective water recovery.

Yet another object of this invention is to provide a novel recovery system as set forth heretofore including as part of the paracanopy thereof a small diameter inflatable torus carried by the trailing end torus of the paracanopy for controlling turbulence along the exterior of the paracanopy during reentry.

Still another object of this invention is to provide a novel recovery system as aforesaid wherein the paracanopy is secured to the aft end of the object, such as an external booster tank, which is to be recovered, and upon deployment, the protective sheath is inflated to totally and intimately surround the recoverable object.

Still another object of this invention is to provide a novel manned spaced vehicle having leading and aft ends, a decelerator/stabilizer paracanopy stowed at the aft end of the manned space vehicle during launch, the space vehicle further having along virtually its entire exterior surface a protective skin fixed in spaced relationship thereto, the protective skin being lightweight and highly heat-resistant thereby permitting the space vehicle to be constructed of lightweight relatively low reinforced materials and, for example, excluding heat-resistant reentry tiles as is common today. The protective sheath further affords protection to the occupants of the space vehicle, the space vehicle itself and its components during reentry at which time the paracanopy is deployed for deceleration purposes.

Yet another object of this invention is to provide a novel deceleration/stabilizer paracanopy stowed in a separate annular housing which can be secured to the vehicle (rocket booster) which is to be recovered.

Still another object of this invention is to provide a novel recovery system for a space vehicle having leading and aft ends, one of said ends housing the decelerator/stabilizer paracanopy of this invention and the other end housing the protective sheath whereby upon inflation of both section the space vehicle is both protected and decelerated/stabilizer during reentry.

Yet another object of this invention is to provide a novel recovery system as aforesaid wherein the payload can be, for example, a single manner emergency escape capsule or pod ejected from a manned spaced vehicle for personnel recovery during an emergency, or a space satellite which can similarly be ejected and recovered upon deployment of the deceleration/stabilization paracanopy should either the manned vehicle or the space satellite become endangered before, during and after launch.

With the above and other objects in view that will hereinafter appear, the nature of the invention will be more clearly understood by reference to the following detailed description, the appended claims and the several view illustrated in the accompanying drawings.

BRIEF DESCRIPTION OF THE DRAWINGS

FIG. 1 is a highly schematic view of a recovery system associated with the manned or unmanned space vehicle of this invention, and illustrates a fixed inflated annular skin carried by a manned or unmanned space vehicle at launch/orbit/entry and the deployment of a "paracanopy" for decelerating and stabilizing the space vehicle during reentry.

FIGS. 2A and 2B are enlarged fragmentary views of an aft end of the space vehicle, and illustrates the progressive paracanopy development under the progressive inflation thereof.

FIG. 6 is a fragmentary cross-sectional view similar to FIG. 5, and illustrates the exterior protective annular sheath being formed of a plurality of interconnected manifolds, and a plurality of elongated inflatable spacers between the sheath and an exterior surface of the manned vehicle.

FIG. 7 is an enlarged fragmentary cross-sectional view of a housing in which is stored the decelerator/stabilizer paracanopy of this invention, and illustrates the manner in which doors of the housing can be opened to deploy the paracanopy, as shown in FIG. 4, and explosive bolts for jettison the entire housing.

FIG. 8, which appears of the sheet of drawing containing FIGS. 1 and 2, is a schematic view of the reentry system, and illustrates the paracanopy being jettisoned to enable the manned or unmanned vehicle to be automatically or manually flown to earth and landed.

FIG. 12 is a fragmentary longitudinal sectional view of the fully inflated recovery system of FIG. 11, and illustrates an uninflated frusto-conical skin of heat-resistant material connected between an outermost inflated torus and an annular inflated protective sheath spaced by longitudinal ducts from the exterior surface of the external tank.

FIG. 13 is an end elevational view looking from left-to-right in FIG. 12, and illustrates details of the decelerator/stabilizer paracanopy.

FIG. 14 is a cross-sectional view taken generally along line 14—14 of FIG. 12, and illustrates the manner in which the annular protective inflated sheath is made from a plurality of interconnected longitudinally extending sections spaced from the exterior of the external tank by longitudinally extending, circumferentially spaced inflated spacers.

FIG. 15 is an end view looking from right-to-left in FIG. 12, and illustrates the attenuator portion of the recovery system.

FIG. 16 is a side elevational view with a longitudinal portion shown in cross-section, and illustrates a recovery system similar to that of FIGS. 9 through 15, and illustrates an annular buoyancy member for aerostatic buoyancy on water or land prior to recovery of the associated external tank.

FIG. 17 is a cross-sectional view taken generally along line 17—17 of FIG. 16, and illustrates details of the annular protective sheath and the spacing thereof from the external tank by longitudinally extending inflated ducts.

FIG. 18 is a cross-sectional view taken generally along line 18—18 of FIG. 16, and more clearly illustrates the cross-sectional configuration of the protective annular sheath and the longitudinally extending inflated spacing ducts.

FIG. 25, which appears on the sheet of drawings containing FIGS. 16 through 18, is a cross-sectional view through a modified torus of the invention, and illustrates four annular chambers defining the torus and a dividing wall connected to an associated decelerator/stabilizer skin.

DESCRIPTION OF THE PREFERRED EMBODIMENTS

Figure 5:
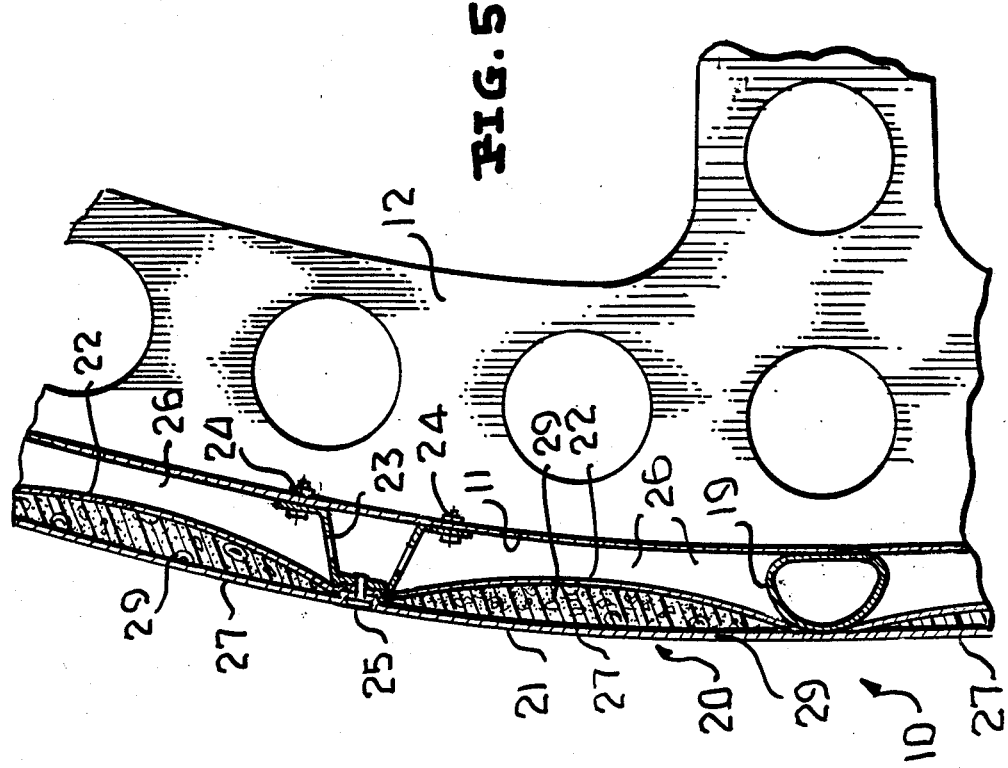
FIG. 5 is an enlarged fragmentary sectional view taken generally along line 5—5 of FIG. 4, and illustrates the inflated protective annular sheath fixed in spaced relationship to an exterior surface of the space vehicle.

The invention addresses an approach heretofore unconsidered by others, namely, that of placing an inflated protective sheath of a generally annular configuration in intimate surrounding relationship to a manned or unmanned space vehicle and associating therewith, as an integral portion or a separate section, a decelerator/stabilizer paracanopy having an inflatable rigid frame which establishes the configuration of an uninflated heat-resistant frusto-conical decelerator/stabilizer skin. Thus, the dual concept of the present recovery system includes (1) the intimate association of an annular inflated protective sheath contiguously surrounding the object to be protected and (2) a frusto-conical uninflated decelerator/stabilizer skin which need but have sufficient integrity to offset hostile reentry aerodynamic and temperature environment. In this way the total weight and size of the overall recovery system in kept at a minimum which automatically increases the cost-efficiency of both vehicle launch and reentry.

In keeping with the foregoing, reference is first made to FIG. 1 of the drawings which illustrates a manned space vehicle 10 which, for simplicity of disclosure, is illustrated as having an exterior cylindrical wall 11 (FIG. 5) suitably supported by an interior lightweight frame 12. The space vehicle 10 includes a pressurized compartment 13 closed by a transparent window 14 (FIG. 1). Doors 16 normally exteriorly cover the transparent window 14 and can be selectively opened and closed as dictated at a particular time in the flight/mission. Fairing doors 17 are located at an aft or trailing end 18 of the space vehicle 10. A tail T is fixed to the frame 12 while a pair of swing wings W are suitably pivoted to the frame 12. As shown to the left in FIG. 1, the swing wings W are overlapped during launch with the longitudinal centerline of the vehicle 10. However, upon reentry (FIG. 1, right side), the swing wings W are swung or pivoted to the in-use or glide position.

The space vehicle 10 includes a generally deployable or fixed annular inflated protective sheath 20 intimately adjacent to but spaced from the cylindrical wall 11 about the entire periphery thereof, but excluding the doors 18. The doors 16 are, however, simply movable or hinged portions of the overall protective sheath 20.

The protective sheath 20 is formed of an outer, generally cylindrical, lightweight fabric or skin 21 (FIG. 5) and a similar inner lightweight fabric or skin 22, both of which, but particularly the outer skin 21, are heat-resistant to protect against reentry temperatures (presently 2600°–3200° F. with the current shuttle). However, due to this new recovery system flight path and subsequent vehicle's weight reduction, as compared to the present shuttle, and the increased efficiency of a decelerator/stabilizer to be described hereinafter, maximum temperature during entry will not exceed 1500° F. Hence, the outer skin 21 can be lighter and thinner, thus again reducing the overall weight of the space vehicle 10 at launch and, of course, reentry.

Figure 4:
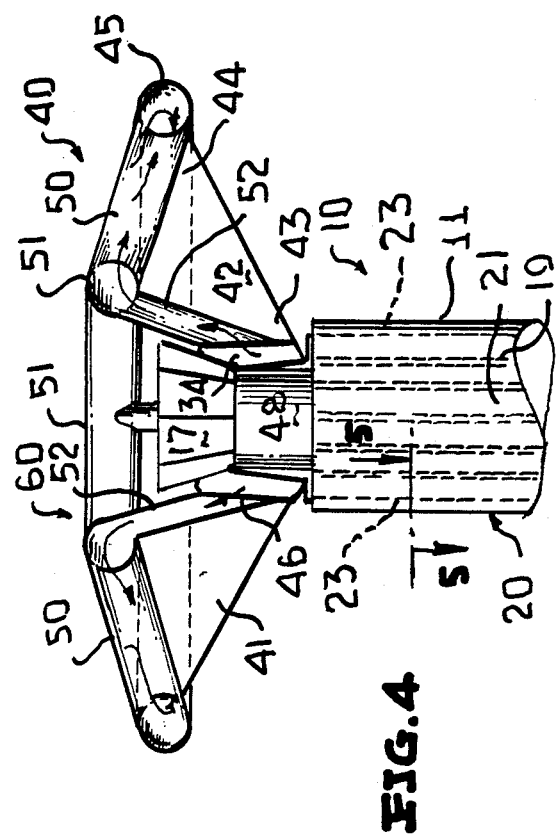
FIG. 4 is a cross-sectional view taken generally along line 4—4 of FIG. 3, and illustrates further details of the paracanopy including the generally frusto-conical shape of the flexible uninflated skin defining a decelerator/stabilizer surface.

A longitudinally extending metal bracket 23 is secured by fasteners 24 (FIG. 5) to the cylindrical wall 11 of the space vehicle 10, and conventional fasteners 25 secure the skins 21, 22 to the bracket 23. Two such brackets 23 are provided at diametrically opposite sides of the space vehicle 10 and extend the length thereof in parallel relationship to each other (FIG. 4). The brackets 23 hold the protective sheath 20 to the cylindrical wall 11 until the protective sheath 20 and longitudinal tubular spacers 19 are inflated, as will be described more fully hereinafter. However, it is noted that the metallic brackets 23 are kept at a minimum (a single bracket 23 being possible) to reduce heat conduction from reentry temperature inward to the cylindrical wall 10. The bracket 23 is provided with numerous holes along the length thereof for reducing overall weight and permitting fluid flow through the brackets and a first chamber or plenum 26 defined between the cylindrical wall 11 and the inner skin 22. A similar outer or second chamber or plenum 27 is defined between the skins 21, 22. The annular protective sheath 20 and the longitudinal tubular spacers 19 are inflated by pressurizing one or both chambers 26, 27 with air when the space vehicle 10 is at earth atmosphere to approximately 2 P.S.I. ($\pm\frac{1}{2}$ P.S.I.) (and with appropriate pressure changes during flight). Since the skin 22 is slightly more flexible than the skin 21, the pressure in the chamber 27 flexes the skin 22 toward the cylindrical wall 11, as shown in FIG. 5. In this manner the skins 21, 22 are held by the spacers 19 and the brackets 23 spaced from but in intimate relationship to the wall 11 of the space vehicle 10. The air/gas within the chambers 256, 27, particularly within the chamber 27, serves to protect and isolate the vehicle and its occupants from the high reentry temperatures heretofore noted, as will be described more fully hereinafter.

Inlets and outlets, valves, pumps and the like associated with the tubular spacers 19 and the chambers 26, 27 to control the pressures therein form no part of this invention and, therefore, are not illustrated. However, where necessary or desirably, such pumps can be connected to sources of cooling gas to circulate the same through the chamber 26, the chamber 27, both chambers 26, 27 and/or to atmosphere. A two-part fluid foam may be injected into the chambers 27 or the chambers 26 or both chambers 26, 27 and/or the longitudinal spacers 19 thereby displacing the pressurized air or gas and hardening into a rigid lightweight foam, before launch. Alternatively, extremely small hollow varied diameter microspheres of lightweight heat-resistant glass or other suitable material can be used to fill the chamber 26 and/or 27 before launch in lieu of plastic foam. As another alternative, the coverings 21, 22 are formed from Nextel ® which is a ceramic fiber product designed by Ceramic Materials Department 3M, 3M Center, St. Paul, Minn. 55144, or similar material for high temperature applications. The fibers of the coverings 21, 22 can be "pulled" internally to form a plurality of loops 29, and the inner surface "unnumbered" of each of the coveryings 21, 22 is sealed with a coating of silicone. Glass bubbles, such as "Scotchlite," a product of Structural Products Department/3M, 220-7E 3M Center, St. Paul, Minn. 55144 are then mixed with a binder, and the latter admixture is injected under high pressure from one end of each chamber 27 filling each chamber as the inflating gas is released from an opposite end of each chamber 29. In lieu of glass bubbles or in conjuction therewith, the admixture can also include "Macrolite" or other lightweight insulative material, and the glass bubbles and/or "Macrolite" can be of a generally the same diameter or varying diameters, and the latter case can be an admixture of 3M "Macrolite" ML-535; ML-704; and ML-3050. This admixture not only fills each of the chambers 27, but intimately surrounds and enters the loops 29, solidifies, and is thus intimately bonded to the coverings 21, 22 through the loops 29. Furthermore, when the sodium silicate liquid hardens, it essentially transforms each chamber 27 into a light-weight rigid panel having extremely good thermal shock resistance and temperature capability to resist temperatures well in excess of reentry temperatures. While the skins or coverings 21, 22 have been illustrated in FIG. 5 as a continuous sheets of considerable peripheral or circumferential extent, each can be of a limited circumferential size corresponding to the size of each chamber 27. For example, in FIG. 5 the completely illustrated centermost of the three illustrated chambers 27 could be formed from two individual skins or coverings 21, 22, each approximately 30 inches wide fashioned with a curvature to match a 20 to 30 foot diameter vehicle, and each being in a length of 5, 10 or 20 feet so that each can be prefabricated, filled and rigidified with the mixtures aforesaid and stored as need be for future use. These individual panels of 5, 10 or 20 feet in length could then be individually applied side-to-side and end-to-end to the particular vehicle until essentially the entire exterior surface thereof is covered. Obviously, an advantage of this approach beyond prefabrication is that the panel which might be damaged can be removed and replaced with a like similar size panel with little effort and minimum expense.

Furthermore, as an alternative, some or all of the fasteners 25 can be provided with axial openings to permit pressurized cooling gas to exit the chambers 26 and/or 27, as heretofore noted, and admix with the outside boundary layer of air along skin 21 to additionally assist vehicle cooling during reentry. Obviously, in this case the chambers 26 and/or 27 are not filled with any insulating material or are filled with loose glass bubbles and/or "Macrolite" to permit gas to flow therethrough. Furthermore, while each of the chambers 27 is preferably filled in the manner just noted, it is also within the scope of this invention to equally charge each of the chambers 26 with formed and solidified or loose glass bubbles, "Macrolite," similar insulative material and/or combinations thereof. However, apart from the variables just noted, the significance of the fixed annular protective sheath 20 is that is is lightweight because of its intimate association (close to) or in contact with the vehicle cylindrical wall 11 and yet offers excellent protection against high temperature during reentry because of the nature (heat-resistance) of the coverings 21, 22 thereof and the pressurized air (or rigidified lightweight foam glass microspheres, or other suitable material) within the chambers 26 or 27, or both.

Thus, the vehicle 10 can be constructed of very light material without concern of heavy heat-resistant tiles as are now utilized in the current space shuttle. Accordingly, rather than $1500 per pound of vehicle launch cost, the present invention reduces this to a more acceptable figure of $150 to $500 per pound depending on vehicle design requirements.

In order to decelerate the space vehicle 10 during reentry, the aft or trailing end 18 carries a generally annular housing 30 (FIGS. 7 and 8) which includes an inboard slightly tapered frusto-conical wall 31 (FIG. 7), a bottom annular wall 32 welded or otherwise attached thereto which is secured to an annular wall 33 of the aft or trailing end 18 of the space vehicle 10 by exposive squib bolts 35 or other means of detachment. The fairings or doors 17 are each connected at upper ends (unnumbered) by pivots 34 to the frusto-conical inboard wall 31. Conventional means (not shown) are used to hold the doors 17 closed during launch (left side of FIG. 1), and at reentry and descent (right side of FIG. 1 and FIGS. 2, 3 and 4) the doors or fairings 17 are opened to deploy therefrom another portion of the recovery system of the present invention, namely, a paracanopy decelerator/stabilizer 40 which is illustrated partially inflated and deployed in FIGS. 2A and 2B and fully deployed and inflated in Figures 3 and 4. When fully deployed (right side in FIG. 1), the decelerator/stabilizer 40 decelerates the space vehicle 10 which in the present example is manned but can instead by an unmanned vehicle, such as a rocket booster.

The decelerator/stabilizer 40 (FIGS. 1, 3 and 4) includes a generally frusto-conical flexible uninflated skin 41 defining a decelerator/stabilizer surface 42 similarly of a frusto-conical configuration which is set-off between relatively axially spaced leading and trailing end portions 43, 44, respectively. The skin 41 is made of Nextel® Kevlar®, graphite, and carbon cloths or other material impregnated with silicone or other suitable alternatives which have high strength to weight ratios to support the space vehicle 10 when subject to reentry loads and reentry temperatures. The leading end portion 43 of the skin 41 is of a lesser diameter than the trailing end portion 44. A relatively large inflatable tours 45 is sewn, glued or otherwise secured to the trailing end portion 44 of the skin 41, whereas a generally annular inflatable protective sheath 46 defining an annular chamber 47 is sewn, glued or otherwise connected to the leading end portion 43 of the skin 41. The annular protective sheath 46 is connected to the frusto-conical wall 31 of the housing 30, and when deployed (FIG. 4), surrounds and protects a cylindrical projecting end 48 of the vehicle end portion 18 during reentry (FIG. 1, right side). A plurality of generally radially directed ducts 50 connect the torus 45 to an inboard smaller diameter torus 51 and the latter is connected by a plurality of ducts 52 to the sheath 46 in fluid communication with the chamber 47 thereof. There are eight ducts 50 and four ducts 52, and all are in fluid communication with each other, with the toruses 45, 51 and with the chamber 47. The chamber 47 is placed in fluid communication with a compressed gas cylinder 59 (FIG. 7) or excess stored vehicle liquid gas, chemical generated gas, or a conventional aspirated source in the housing 30 which will automatically conduct the gas thereof into the annular chamber 47, the ducts 52, the torus 51, the ducts 50 and the torus 45 to inflate the latter components into a relatively rigid fluidic frame or skeleton, generally designated by the reference numeral 60. A conventional aspirator inlet (not shown) could be associated with any desirable portion or portions of the inflatable frame 60 top draw air therein and, thus, augment pressurization supplied by gas under pressure from the tank 59. The material of the inflatable frame 60 may be the same material as the skin 41 to resist the heat of entry/reentry, yet provide sufficient fluidic rigidity to the frame 60 so that the decelerator/stabilizer surface 42 remains relatively taut during vehicle reentry.

During reentry (right-side of FIG. 1 and FIG. 2) the doors 17 progressively open (FIGS. 2A and 2B0, the gas pressure in the tank 59 progressively inflates the frame 60 resulting in the progressive deployment thereof outwardly of the housing 30 until fully deployed (FIGS. 3 and 4), and results in suitable deceleration and stabilization of the vehicle 10 and the total protection thereof because of the rigid fixed inflated protective annular sheath 20 and the protective annular sheath 46. In this manner, as the space vehicle 10 descends (right-hand side of FIG. 1), the entirely of the space vehicle 10 is protected, particularly against high reentry temperatures and aerodynamic forces. At an appropriate height above the earth's surface the bolts 35 (FIG. 7) are blasted away and the entire housing 30 separates from the cylindrical wall 48 (FIG. 8) for subsequent recovery refurbishment, as necessary, and reuse of the paracanopy decelerator/stabilizer 40. The portion(s) of the protecive sheath 20 defining the doors 16 may be opened if necessary to permit the occupants to see through the transparent windshield 14 for landing purposes. Other similar portions of the protective sheath 20 are opened (or jettisoned) to expose retractable landing gear (not shown), and the swing wings W (FIG. 1, right) are swung/pivoted to their in-use position, permitting the space vehicle 10 be "flown" (glided) to a ground landing.

Reference is made to FIG. 6 of the drawings which illustrates another protective annular sheath 70, corresponding in function to the protective annular sheath 20, completely encompassing the wall 11 of the space vehicle 10. In this case the sheath 70 is made of a plurality of longitudinally extending inflatable sheath sections chambers or manifolds 71 joined in abutting side-to-side relationship by longitudinally extending strips 72. The strips 72 are sewn(,) adhesively bonded, or otherwise connected to the adjacent sections 71 and selected ones or all of the sections 71 can be provided with aspirator and/or bleed valves to maintain the pressure uniform throughout each of the sections 71. Moreover, since the metallic brackets 23 (FIG. 5) tend to conduct heat, the latter have been replaced by a plurality of longitudinally extending, inflated tubes 73 sewn and/or adhesively bonded to the inflated sections 71. The inflated tubes 73 are spaced about the cylindrical wall 11 in parallel axially extending rows, as in the case of the spacers 19 of FIG. 4 and, thus, maintain the annular protective sheath 70 in spaced relationship to the cylindrical wall 11, but with less heat conductivity because of the low heat transmissability of the material of the tubes 73 (and the gas/air therewithin). Each chamber 71 and the tubes 73 are, of course, inflated and vary to the desired approximate 2 P.S.I. above atmospheric pressure prior to launch of the space vehicle 10. The tubes 73 are secured only to the chambers 71, not to the cylindrical wall 11.

Reference is now made to FIGS. 9 through 15 of the drawings which illustrates another space vehicle 80 which is a conventional shuttle external booster tank 80 containing a liquid oxygen storage tank 81 at a leading end 82 of the external tank 80 and a liquid hydrogen tank 83 at a trailing or aft end 84 of the external tank 80. The reentry direction of the external tank 80 is from left-to-right in FIGS. 9-12. The aft end 84 includes a generally frusto-conical housing 85 made of two housing halves (individually unnumbered) bolted to each other and to the aft end 84 and carrying centrally thereof a generally cylindrical tube 86 to which are pivotally secured a plurality of fairing doors 87 which pivot from the closed position (FIG. 9) to the open position (FIG. 10) to deploy of an inflatable recovery system 90 (FIGS. 10 through 12) which is inflated by gassified hydrogen, or other gas from the tank 83, tank 81 or a separate added tank (not shown).

A suitably automatically controlled valve (not shown) connects the interior of the hydrogen tank 83 to the cylindrical tube 86 which includes a plurality of openings 89 (FIG. 10) for introducing the hydrogen gas into the inflatable recovery system 90. As the inflatable recovery system 90 begins to inflate/deploy, it progessively (FIG. 11) begins to enshroud the external tank 80 from right-to-left because of the structural arrangement of the various components thereof and the direction of travel during reentry/descent of the space vehicle 80 with the aft end 84 leading, as indicated by the unnumbered headed arrows associated therewith in FIGS. 9 through 12.

When fully inflated (FIG. 12), the overall recovery system or structure 90 includes an attenuator section or means for attenuating impact forces, which is generally designated by the reference numeral 100, and means for decelerating/stabilizing and protecting the external tank 80, which is generally designated by the reference numeral 120.

The attenuator section or means 100 includes four toruses 101–104 having a common undulating tubular inner wall 105 in exterior surrounding relationship to the tube 86. The torus 101 is preferably secured to the free edges (unnumbered) of the doors 87 so that as the doors pivot from their closed position (FIG. 9) toward their open position (FIGS. 10 and 11) the torus 101 will be extended forwardmost in the direction of travel, as shown in FIG. 12. As the hydrogen exits, the openings 89 through torus gas plenum (FIG. 12), it enters one or more openings 106 in the torus 103 or in others of the toruses 101, 102 and 104, all of which are placed in fluid communication with each other through like openings, as indicated by the unnumbered headed arrows associated therewith in FIG. 12. Thus, the hydrogen enters the openings 106 and begins filling the toruses 101 through 104 and an annular protective sheath 110 contructed from a plurality of longitudinally extending adjacent tubes, ducts, sections or chambers 111 (FIGS. 13 and 14). The hydrogen travels from the torus 104 from right-to-left down each of the sections 111 into and inflating a torus 112. The torus 112 has a plurality of valve apertures 113 along its inner surface which bleed the hydrogen into a plurality of spaced annular chambers 114 which progessively narrow from left-to-right in FIG. 12 into a plurality of circumferentially spaced longitudinally extending circumferentially spaced ducts or spacers 115 (FIG. 14) which are closed at the end thereof adjacent the torus 104. The hydrogen which flows from right-to-left in FIG. 12 along the protective sheath sections 111 also enters through a plurality of openings 116 into the interior of a torus 117 which is in turn connected by a plurality of ducts or spokes 118

(FIG. 13) to an outer torus 119. As the recovery structure 90 is progressively pressurized (FIG. 11) to approximately 2 P.S.I above atmospheric pressure at complete pressurization (FIGS. 12-15), a decelerator/stabilizer skin or covering 121 is drawn taut to a generally frusto-conical configuration, as is best illustrated in FIG. 12, with a leading end portion 122 being sewn and/or adhesively bonded to the exterior of the protective sheath 110 and a larger diameter trailing end portion 123 being sewn and/or bonded to the torus 119.

Means for increasing air turbulence to further reduce vehicle velocity during reentry is generally designated by the reference numeral 125 which is a relatively small diametered torus 125 sewn, adhesively bonded, or otherwise attached to the torus 119 and inflated therefrom by a plurality of openings (not shown) between the toruses 119, 125.

Figure 3:
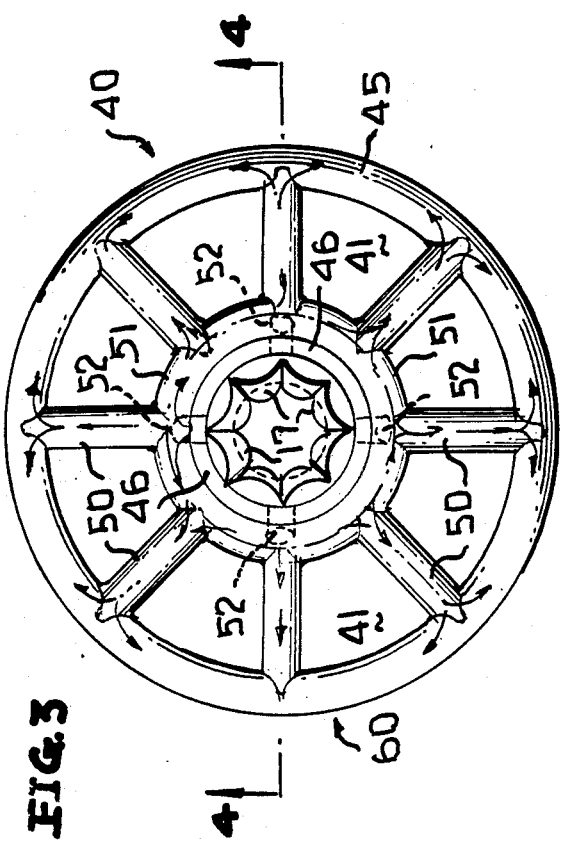
FIG. 3 is an enlarged top plan view of the paracanopy, and illustrates an inflated frame thereof including an outermost torus, a plurality of radiating ducts, an inner torus, a heat shield skin, and an annular sheath surrounding the aft end of the vehicle.

As the external tank 80 descends with its aft end 84 leading and, of course, with the recovery structure 90 fully inflated (FIG. 12), the frusto-conical skin 121 functions as a decelerator and stabilizer, just as in the case of the decelerator/stabilizer surface 42 of the skin 41 of FIGS. 1, 3 and 4. Furthermore, the sheath 110 totally encapsulates and thus protects the tank 80 preventing adverse effects thereto during high temperature entry/reentry. The attenuator means 100 prevents damage to the external tank/space vehicle upon impact with either water or land. The larger torus 119 also prevents space vehicle damage after the attenuator-end contacts ground or water as the external tank 80 tips from its generally vertical impact position toward the earth's surface (ground/water). The leading end 82 would be protected against impact by the large torus 119, and smaller toruses 112, 117 and the protective annular sheath 111, but, obviously, much greater impact loads can be sustained by the larger torus 119. Thus the torus 119 not only maintains the decelerator/stabilizer skin 121 taut during descent/reentry, but also functions as an impact attenuator after vertical impact as the end portion 82 tips toward the ground, as well as keeping the vehicle floating, if water-landed.

Reference is now made to FIGS. 16 through 18 of the drawings which illustrate another recovery system or recovery structure which is generally designated by the reference numeral 90' with structure identical to that heretofore described relative to FIGS. 12 through 15 being identically numbered and primed. The recovery structure 90' includes means 130 in the form of an aerostatic buoyancy section which defines a relatively large annular buoyancy chamber 131 which is inflated by hydrogen gas which is introduced into the chamber 131 through a plurality of orifices 132 formed along the torus 117'. The recovery structure 90' is deployed and inflated as that heretofore described 100', the protective sheath 110', and the toruses 117', 119' of the decelerator/stabilizer means 120' being successively inflated/pressurized followed lastly by the inflation of the buoyancy means 130. In this case, the recovery structure 90' is identical to the recovery structure 90 except for a lesser number of toruses 101', 102' of the attenuator means or the attenuator section 100' because the design of the recovery structure 90' is intended to "float" the vehicle to a softer landing with low or no impact velocity. Hence, lesser attenuator toruses 101', 102' are required for impact absorption and attendant exterior tank protection.

Figure 9:
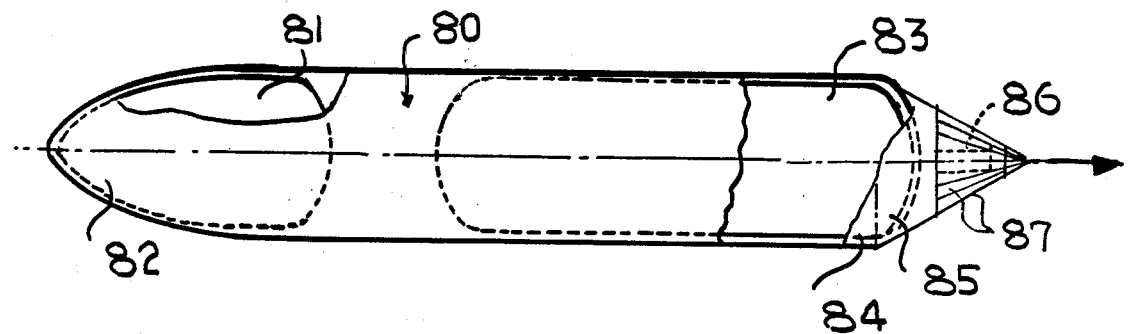
FIG. 9 is a fragmentary side elevational view of another recovery system of this invention, and illustrates a shuttle external tank having an aft end closed by fairing doors behind which is stored the recovery system of this invention.
Figure 10:
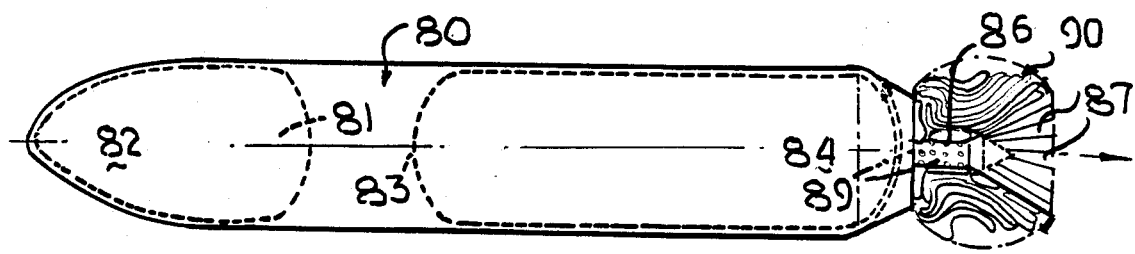
FIG. 10 is a side elevational view similar to FIG. 9, and illustrates the fairing doors opened and the recovery system being inflated.
Figure 11:
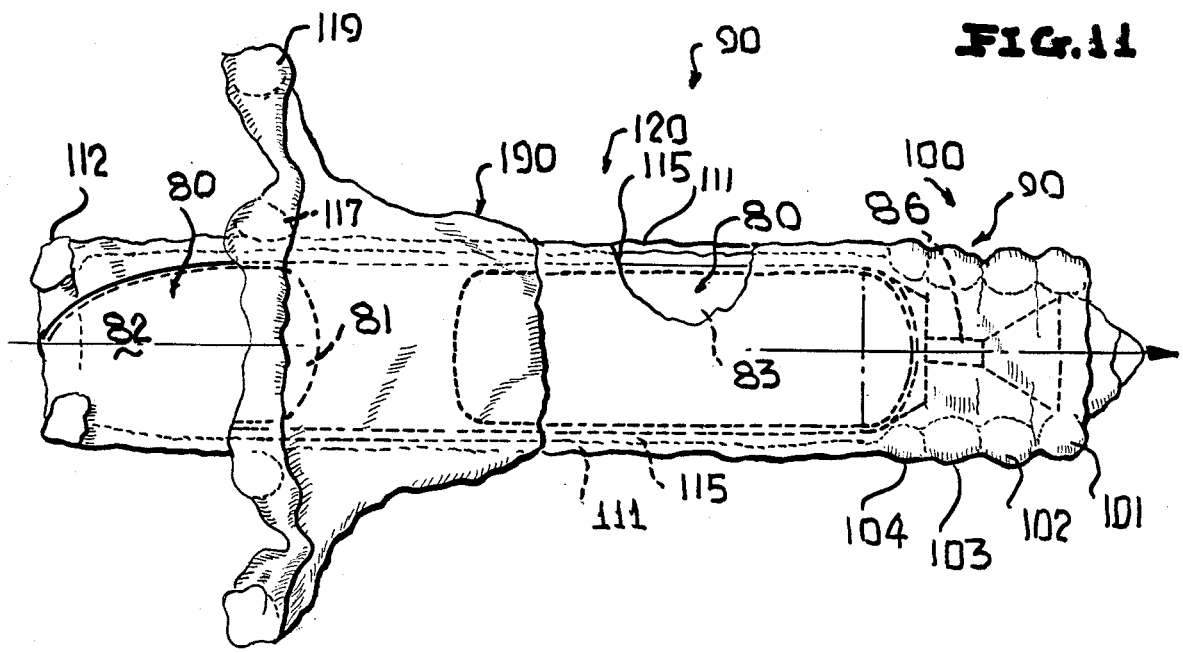
FIG. 11 is a side elevational view similar to FIG. 10, and illustrates the recovery system partially inflated as it initiates the formation of a protective annular sheath, its associated decelerating/stabilizing canopy and an attenuator portion for absorbing impact shocks upon landing.
Figure 19:
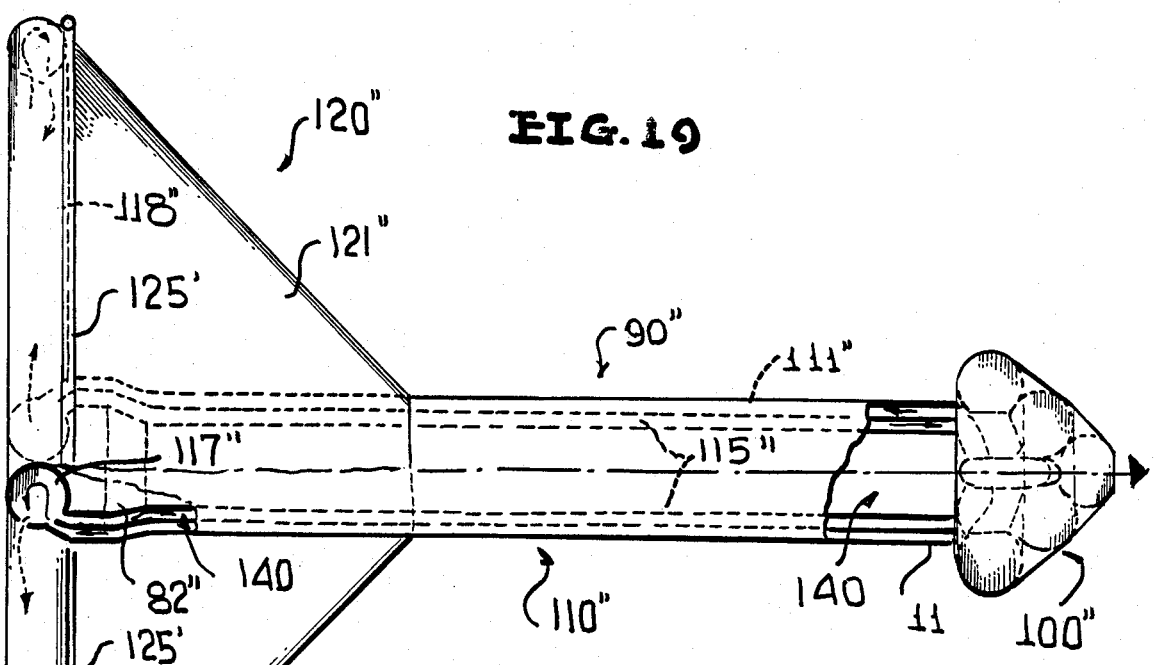
FIG. 19 is a side elevational view of another recovery system of this invention, and illustrates the same fully inflated after being deployed from a housing of a solid rocket booster.

Reference is made to FIG. 19 which discloses another recovery system/structure which is generally designated by the reference numeral 90", the double prime being applied to the recovery structure 90" to identify parts identical to the recovery structure 90' of FIGS. 9 through 15. In this case the recovery system 90" is associated with a solid rocket booster 140 which is staged-off a space vehicle at a predetermined height (approximately 150,000 feet of altitude) during the descent of which gassified hydrogen or other pressurizing gas from a forward tank (not shown), or chemical gas generation system not a part of this invention progressively inflates the attenuator section or attenuator means 100", the protective sheath 110", the toruses 117" and 119" of the decelerator/stabilizer means 120" and the longitudinally extending spacing means, tubes or ducts 115". The entirety of the recovery structure 90" is, of course, stowed in a forward end housing (unnumbered) having doors (not shown) comparable to those disclosed relative to the external tank 80 (FIG. 9). Thus, though not illustrated, the recovery structure 90" progressively deploys relative to the solid rocket booster 140 just as the recovery structure 90 is shown deploying in the stages illustrated progessively in FIGS. 10, 11 and 12 of the external fuel tank 80. However, in the case of the recovery structure 90" the inboardmost torus 117" essentially expands to virtually close and/or contact upon its interior periphery to close or limit the size of the opening of the torus 117" at the end 82" of the solid rocket booster 140 to prevent sea water from entering and contaminating the same when, of course, recovery is at sea, as intended. Furthermore, because of the relative size and weight involved, the decelerator/stabilizer means 120" and particularly the sheath 110" as well as toruses 117", 119", and the spokes 118" function in the dual capacity of the buoyancy means to maintain the entire recovery system 90" and the solid rocket booster 140 afloat until recovery has been effected.

Figure 20:
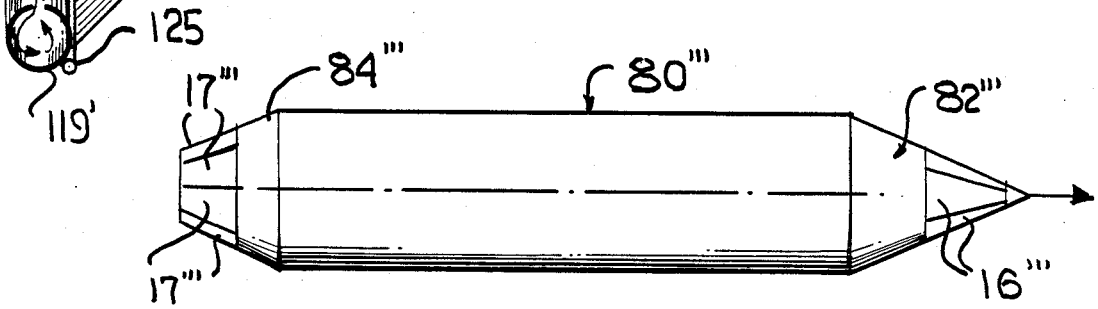
FIG. 20 is a schematic side elevational view of a space vehicle, and illustrates fairing doors closed at leading and trailing ends thereof.
Figure 21:
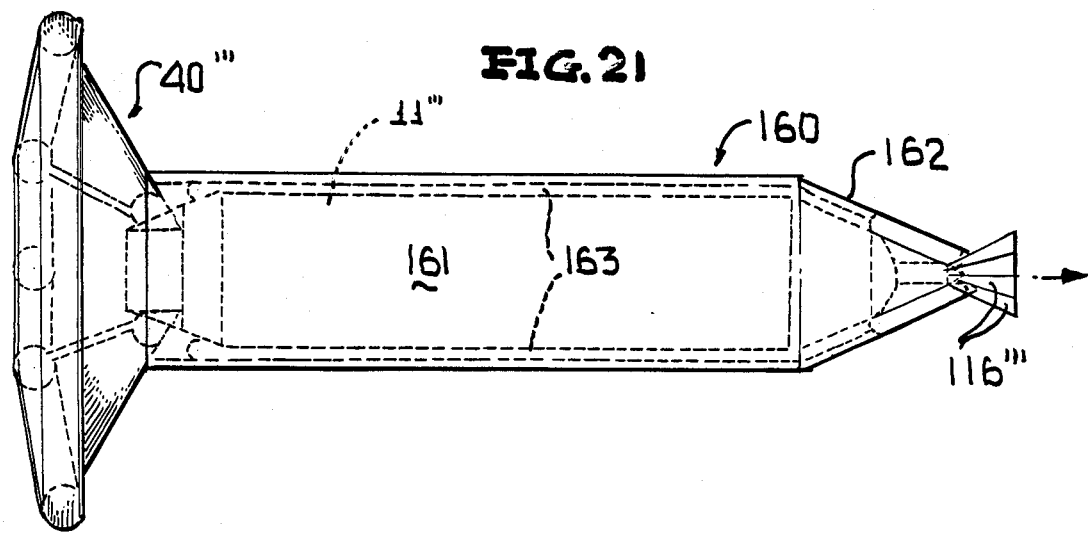
FIG. 21 is a side elevational view of the space vehicle of FIG. 20, and illustrates the same after fairing doors have been opened at opposite ends and an inflatable recover system fully inflated relative to the space vehicle.

In FIGS. 20 and 21 of the drawings another space vehicle is shown and is generally designated by the reference numeral 80''' having a forward or leading end 82''' and an aft end 84''' relative to the direction of travel which is left-to-right in FIGS. 20 and 21. The space vehicle 80''' can be, for example, a manned space vehicle, such as the space vehicle 10 of FIG. 1 or an external tank 80, as in FIG. 9, or solid rocket booster 140, as FIG. 19. The space vehicle 80''' includes a plurality of fairing doors 16''' at the forward end or leading end 82''' and a plurality of fairing doors 17''' at the aft end 84'''. The doors 16''' and 17''' normally enclose respective housings (unnumbered) in which is stored uninflated but inflatable recovery structures 40''' and 160 which may be preinsulated and rigidified with an insulative filler of microsphere or other suitable material, as previously described. The inflatable structure or decelerator/stabilizer 40''' being identical to the decelerator/stabilizer structure 40 of FIGS. 1 through 4. However, the recovery structure 160 includes only an annular protective sheath 161 having a frusto-conical front end portion 162, both of which are spaced intimately from the vehicle cylindrical wall 11''' by a plurality of longitudintally extending spacers 163 corresponding in structure and function to the spacers 19 of FIGS. 1, 2, 4, etc. In this manner the entirety of the space vehicle 80''' is protected by the protective inflated sheath 161, 162 when fully inflated (FIG. 21) and subsequent deceleration/stabilization during entry/reentry is afforded by the decelerator/stabilizer structure 40'''.

Figure 22:
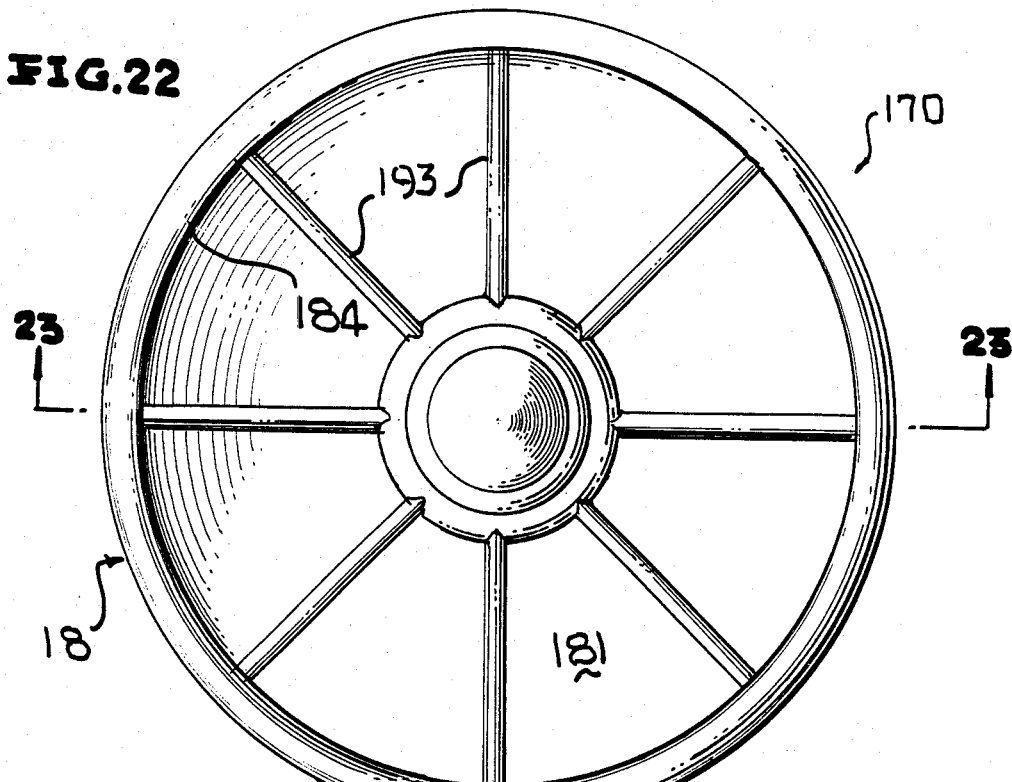
FIG. 22 is a top plan view of another recovery system, and illustrates a protective annular sheath and an inflated frame associated therewith.

Another recovery system or structure constructed in accordance with this invention is illustrated in FIGS. 22 through 24 of the drawings, and is generally designated by the reference numeral 170. The recovery structure 170 is normally stowed uninflated in a housing 171 of a vehicle or capsule 172 which may be used, for example, as an emergency escape pod for returning one or more astronauts from a manned space vehicle should, for example, the same become disabled during launch, orbit and/or reentry. The housing 171 is closed by doors 173 which can be opened in the manner indicated by the doors 17 of the space vehicle 10 (FIGS. 2 and 8).

Figure 23:
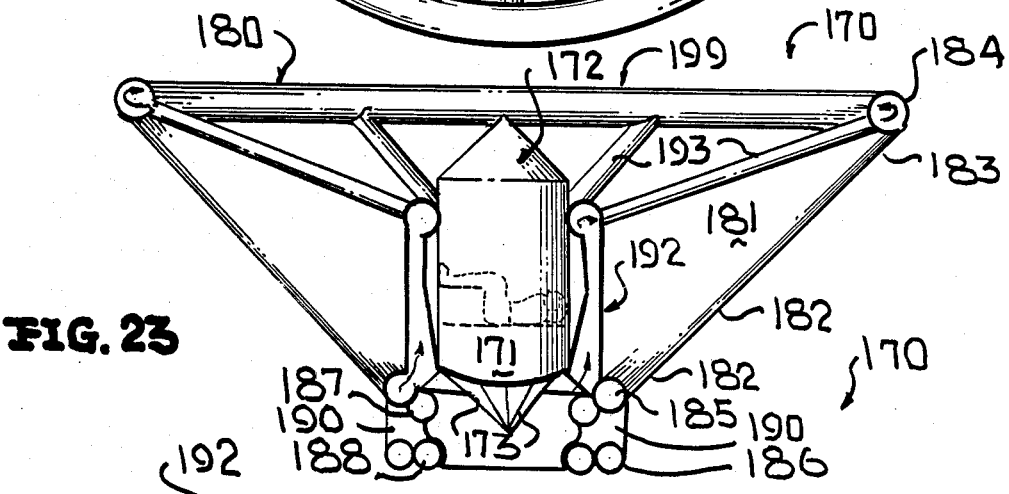
FIG. 23 is a cross-sectional view taken generally along line 23—23 of FIG. 22, and illustrates the annular protective sheath surrounding a manned emergency escape pod and a frusto-conical heat-resistant decelerator/stabilizer supported by the inflated frame.
Figure 24:
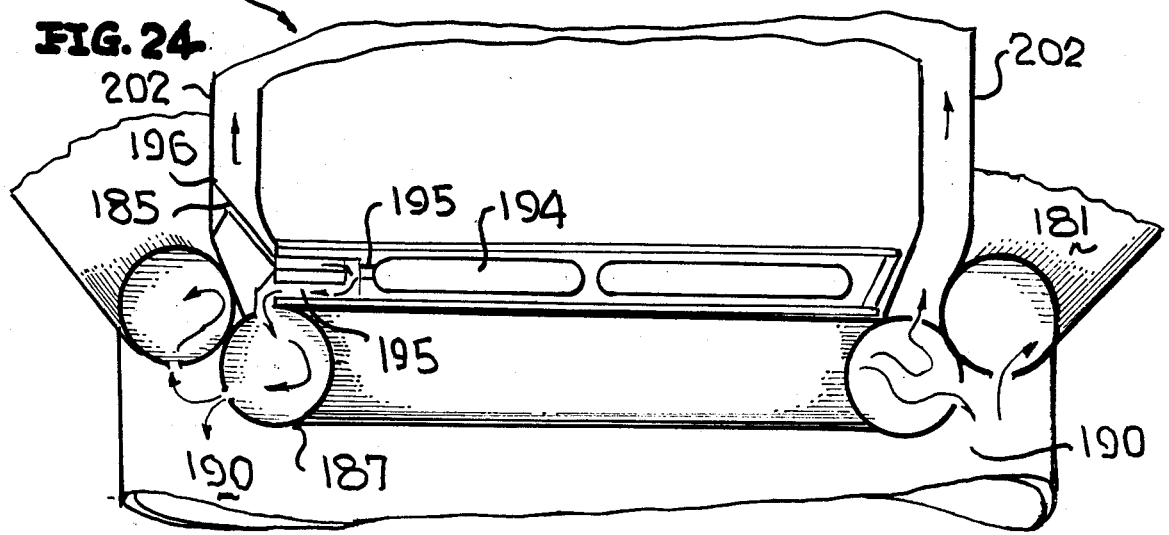
FIG. 24 is an enlarged fragmentary cross-sectional view, and illustrates tanks for compressed gas to inflate the frame of the recovery system.

The structure 170 includes a paracanopy decelerator/stabilizer 180 which is similar in structure to the decelerator/stabilizer 40 of FIGS. 1, 3 and 4. The decelerator/stabilizer 180 is illustrated fully inflated and deployed in FIGS. 22 through 24, and includes a generally frusto-conical flexible uninflated skin 181 defining a decelerator surface 182 also of a frusto-conical configuration which is set-off between relatively axially spaced leading and trailing end portions 182, 183, respectively. The skin 181 is made from the same material as the skin 41 and at its trailing end portion 183 is sewn, glued or otherwise secured to a large inflatable torus 184 whereas its leading end portion 182 is connected to one of several smaller toruses 185, 186 which are radially outboard of smaller diametered toruses 187, 188. The toruses 186, 186 are placed in fluid communication with each other through an axial extending protective annular sheath or plenum 190. Furthermore, conventionally valved openings place the toruses 185, 187 and 186, 188 in fluid communication with each other. The toruses 185, 187 are also secured to a lower edge (unnumbered) of another protective annular sheath 192 having a plurality of ducts or tubes 193 extending between an upper end (unnumbered) of the protective sheath 192 and the larger torus 184. One or more cylinders 194 are appropriately actuated to deliver pressurized gas therefrom through appropriate conduit means 195, for example, (FIG. 24) to various ones of the toruses, specifically the torus 187 and to the annular protective sheath 192 to rapidly deploy/inflate these elements and thereby define a relatively fluidically rigid skeleton or frame 199 which holds the skin 181 taut during reentry. If desired, one or more aspirator openings 196 (FIGS. 24) can be positioned on an exterior annular skin 202 of the sheath 192 to draw air into the annular sheath 192 during descent and thereby assist in the rapid inflation of the frame 199.

When the recovery structure 170 has been fully deployed (FIGS. 22 and 23), the space vehicle 172 will be brought back to earth at an acceptable speed and both the vehicle 172, any personnel therein, etc. will be protected against hostile reentry/entry temperatures by the skin 181 and the protective sheath 192, 190. Obviously, upon impact with the ground, the toruses 185 through 188 attenuate/lessen impact forces to prevent damage of the particular vehicle/cargo/personnel 172, but the main force absorption is effected by the pressurized gas within the protective plenum 190. Conventional means, including a cover of porus expandable meshlike reinforcing cloth, can peripherally surround the entire exterior of the toruses 185, 186 and the plenum 190 so that upon the cloth cover will expand and open to allow gas to escape in proportion to the impact forces. except for minor amounts leaking through the mesh, to continue the impact absorption/attenuation. Alternatively, the exterior wall of the plenum 192 can be provided with one-way pressure actuated valves to immediately vent or bleed gas from the plenum 192 to the exterior.

Reference is now made to FIG. 25 of the drawings which illustrates another torus constructed in accordance with this invention generally identified by reference numeral 219. The torus 219 corresponds in structure and function to all of the toruses heretofore described, but for convenience the torus 219 can, for example, be utilized in lieu of the toruses 117′, 119′ of the decelerator/stabilizer 120′. The substitution of the torus 219 for any or both of the toruses 117′, 119′ has been made simply as a matter of convenience since these toruses appear on the same sheet of drawings, but the torus 219 can equally be substituted for any of the toruses earlier described. The torus 219 is, of course, completely annular in configuration but in this case is defined by four separate annular torus chambers or sections 221 through 224 separated from each other by associated skins, webs or walls 231 through 234, and each of the chambers 221 through 224 further include an outermost annular convex skin or covering 241 through 244, respectively. In this fashion, the torus chamber 221 is, for example, formed of the two sheet like webs 231, 234 and the outer convex skin 241 which collectively define a generally pie-shaped cross-sectional configuration to the overall annular torus chamber 221. The primary purpose for the construction of the torus 219 into four independent isolated torus chambers 221 through 224 is to provide a degree of safety, should, for example, any one or two or more of the torus chambers 221, through 224 become inoperative during inflation or deflate during reentry. Furthermore, because of the webs or walls 231 through 234, the overall torus 219 is internally rigidified and will not collapse or undesirably deform under reentry forces. Furthermore, any one of the webs 231 through 234 can be utilized as the connector or connecting portion for securing the torus 219 to the trailing end portion of the frusto-conical decelerator/stabilizer skin 221′, as is diagrammatically illustrated in FIG. 25 relative to the web 232 which is shown projecting externally of the torus 219 and being sewn-bonded to the trailing end portion (unnumbered) of the frusto-conical decelerator/stabilizer skin 221′. Since all of the webs 231 through 234 are united to each other at an apex 240 thereof, reentry forces applied against the skin 221′ are uniformly transmitted to all of the webs 231 through 234 and the associated torus chambers 221 through 224 thereby assuring uniformity of reentry force loading upon the totality of the torus 219 and the associated skin 121′. Obviously, while the torus 219 has been illustrated as having four chambers, there may be more or less chambers associated therewith, depending, of course, upon the particular verhicle with which the torus 219 is associated, the particular type of reentry involved.

Although a preferred embodiment of the invention has been specifically illustrated and described herein, it is to be understood that minor variations may be made in the apparatus without departing from the spirit and scope of the invention, as defined in the appended claims.

We claim:

1. A paracanopy for decelerating/stabilizing space vehicles, boosters, astronauts, equipment and like payloads during reentry in a generally downward direction comprising a generally frusto-conical flexible uninflated skin defining a decelerator/stabilizer surface having relatively axially spaced leading and trailing end portions, said leading end portion being forwardly of said trailing end portion relative to the direction for reentry, said leading end portion being of a smaller diameter than said trailing end portion, an inflatable torus at said trailing end portion, an inflatable annular protective sheath at least partially disposed within said frusto-conical skin, said annular sheath being adapted to intimately surround at least a portion of a payload housed therein, duct means between said torus and said annular sheath for defining upon inflation thereof a fluidically rigidified frame, housing means for housing said skin, torus, annular sheath and duct means in deflated folded collapsed condition relative to an associated payload, means for opening said housing means incident to payload reentry, and means for inflating said torus, annular sheath and duct means incident to the opening of said housing means and payload reentry to infate and fluidically rigidify said frame thereby maintaining said flexible skin in taut, though uninflated, condition and in progressively spaced relationship from said annular sheath between said leading and trailing end portions and with said leading end portion leading said trailing end portion relative to the direction of reentry.

2. The paracanopy as defined in claim 1 wherein said annular sheath has relatively axially spaced leading and trailing end portions, and said duct means include tubular ducts fluidically connected to and between said torus and said annular sheath trailing end portion.

3. The paracanopy as defined in claim 1 including another inflatable torus, said first-mentioned torus having a diameter greater than the diameter of said another inflatable torus, and said duct means include tubular ducts fluidically connected to and between said first-mentioned torus and said another torus and between said another torus and said annular sheath.

4. The paracanopy as defined in claim 1 including another inflatable torus, said first-mentioned torus having a diameter greater than the diameter of said another inflatable torus, said annular sheath having relatively axially spaced leading and trailing end portions, and said duct means include tubular ducts fluidically connected to and between said first-mentioned torus and said another torus and between said another torus and said annular sheath between the leading and trailing end portions thereof.

5. The paracanopy as defined in claim 1 including another inflatable torus, said first-mentioned torus having a diameter greater than the diameter of said another inflatable torus, said duct means include tubular ducts fluidically connected to an between said first-mentioned torus and said another torus and between said another torus and said annular sheath, and said tubular ducts are disposed in spoke-like configuration between said first-mentioned torus and said another torus.

6. The paracanopy as defined in claim 1 including another inflatable torus, said first-mentioned torus having a diameter greater than the diameter of said another inflatable torus, said duct means include tubular ducts fluidically connected to an between said first-mentioned torus and said another torus and between said another torus and said annular sheath, and said tubular ducts are disposed in spoke-like configuration between said another torus and said annular sheath.

7. The paracanopy as defined in claim 1 including another inflatable torus, said first-mentioned torus having a diameter greater than the diameter of said another inflatable torus, said duct means include tubular ducts fluidically connected to and between said first-mentioned torus and said another torus and between said another torus and said annular sheath, said tubular ducts are disposed in spoke-like configuration between said first-mentioned torus and said another torus, and said tubular ducts are also disposed in spoke-like configuration between said another torus and said annular sheath.

8. The paracanopy as defined in claim 1 including means for removably securing said housing means to a trailing end portion of an associated payload.

9. The paracanopy as defiined in claim 1 including means for removably securing said housing means to a leading end portion of an associated payload.

10. The paracanopy as defined in claim 1 including means for controlling turbulence along the exterior of said paracanopy during reentry.

11. The paracanopy as defined in claim 1 including inflatable means for controlling turbulence along the exterior of said paracanopy during reentry.

12. The paracanopy as defined in claim 1 including means carried by said torus for controlling turbulence along the exterior of said paracanopy during reentry.

13. The paracanopy as defined in claim 1 including inflatable means carried by said torus for controlling turbulence along the exterior of said paracanopy during reentry.

14. The paracanopy as defined in claim 1 including inflatable torus means of relatively small cross-sectional area carried by said first-mentioned torus for controlling turbulence along the exterior of said paracanopy during reentry.

15. The paracanopy as defined in claim 1 including means for spacing an inner annular surface of said annular sheath from an exterior surface of an associated payload.

16. The paracanopy as defined in claim 1 including a plurality of circumferentially spaced means for spacing an inner annular surface of said annular sheath from an exterior surface of an associated payload.

17. The paracanopy as defined in claim 1 including a plurality of circumferentially and axially spaced means for spacing an inner annular surface of said annular sheath from an exterior surface of an associated payload.

18. The paracanopy as defined in claim 1 including a plurality of circumferentially spaced and axially extending means for spacing an inner annular surface of said annular sheath from an exterior surface of an associated payload.

19. The paracanopy as defined in claim 1 including inflatable means in spaced relationship to each other disposed between an inner annular surface of said annular sheath and an exterior surface of an associated payload for maintaining said last-mentioned surfaces in spaced relationship to each other.

20. The paracanopy as defined in claim 1 including a plurality of circumferentially spaced and axially extending inflatable means for spacing an inner annular surface of said annular sheath from an exterior surface of an associated payload.

21. The paracanopy as defined in claim 1 including a plurality of circumferentially spaced and axially extending inflatable means for spacing an inner annular surface of said annular sheath from an exterior surface of an associated payload, and said inflatable spacing means are a plurality of tubular ducts.

22. The paracanopy as defined in claim 1 including a plurality of circumferentially spaced and axially extending inflatable means for spacing an inner annular surface of said annular sheath from an exterior surface of an associated payload, said inflatable spacing means are a plurality of tubular ducts, and means for conducting an inflating media of said inflating means in opposite axial directions within said annular sheath and tubular ducts to inflate the same.

23. The paracanopy as defined in claim 1 wherein said annular sheath includes an attenuator section which projects axially beyond a leading end portion of an associated payload for attenuating impact forces upon payload-to-surface contact.

24. The paracanopy as defined in claim 1 wherein said annular sheath includes a buoyancy section which projects axially beyond said trailing end portion for providing buoyancy to said payload in the event of water recovery.

25. The paracanopy as defined in claim 1 wherein said annular sheath includes an attenuator section which projects axially beyond a leading end portion of an associated payload for attenuating impact forces upon payload-to-surface contact, and said annular sheath further includes a buoyancy section which projects axially beyond said trailing end portion for providing buoyancy to said payload in the event of water recovery.

26. The paracanopy as defined in claim 1 including means for injecting a solidifiable material into said annular sheath.

27. The paracanopy as defined in claim 1 including means for injecting a solidifiable form into said annular sheath.

28. The paracanopy as defined in claim 1 including means for injecting foamable and solidifiable material into said annular sheath.

29. The paracanopy as defined in claim 1 including means for separating said annular sheath into a plurality of separate circumferentially disposed chambers.

30. The paracanopy as defined in claim 1 including a plurality of separate plenums disposed in circumferential contiguous relationship for defining said annular sheath, and means for securing adjacent plenums to each other.

31. The paracanopy as defined in claim 1 including a plurality of separate plenums disposed in circumferential contiguous relationship for defining said annular sheath, means for securing adjacent plenums to each other, and means between circumferentially adjacent securing means for spacing said plenums from an exterior surface of an assocaited payload.

32. The paracanopy as defined in claim 1 including a plurality of separate plenums disposed in circumferential contiguous relationship for defining said annular sheath, means for securing adajcent plenums to each other, and means at said securing means for spacing said plenums from an exterior surface of an associated payload.

33. A paracanopy as defined in claim 1 wherein said annular sheath covers the entirety of said payload between the leading and trailing ends thereof.

34. The paracanopy as defined in claim 1 including a relatively large volume inflatable buoyancy chamber adjacent said torus and inflatable by said inflating means for maintaining the payload buoyant during water recovery, and said buoyancy chamber being housed in deflated collapsed folded condition in said housing means.

35. A paracanopy for decelerating/stabilizing space vehicles, boosters, astronauts, equipment and like payloads comprising a generally frusto-conical flexible uninflated skin defining a decelerator/stabilizer surface having relatively axially spaced leading and trailing end portions, said leading end portion being of a smaller diameter than said trailing end portion, an inflatable torus at said trailing end portion, an inflatable annular protective sheath at least partially disposed within said frusto-conical skin, said annular sheath being adapted to intimately surround at least a portion of a payload housed therein, means for connecting said paracanopy to an associated payload, duct means between said torus and said annular sheath for defining upon inflation thereof a fluidically rigidified frame, means for inflating said torus, annular sheath and duct means incident to vehicle reentry to fluidically rigidify said frame thereby maintaining said flexible skin in taut, though uninflated, condition and in progessively spaced relationship from said annular sheath between said leading and trailing end portions, means for spacing an inner annular surface of said annular sheath from an exterior surface of an associated payload, and means for injecting a cooling gas between said annular sheath inner annular surface and said payload exterior surface.

36. The paracanopy as defined in claim 35 including means for exhausting fluid from between said annular sheath inner annular surface and said payload exterior surface.

37. The paracanopy as defined in claim 35 including means for exhausting fluid from between said annular sheath inner annular surface and said payload exterior surface during the cooling gas injecting whereby the latter can be accommodated in the absence of undesired annular sheath expansion.

38. The paracanopy as defined in claim 35 including means for exhausting fluid from between said annular sheath inner annular surface and said payload exterior surface through said spacing means.

39. The paracanopy as defined in claim 35 including means for exhausting fluid from between said annular sheath inner annular surface and said payload exterior surface through said spacing means during cooling gas injecting whereby the latter can be accommodated in the absence of undesired annular sheath expansion.

40. A paracanopy for decelerating/stabilizing space vehicles, boosters, astronauts, equipment and like payloads comprising a generally frust-conical flexible uninflated skin defining a decelerator/stabilizer surface having relatively axially spaced leading and trailing end portions, said leading end portion being of a smaller diameter than said trailing end portion, an inflatable torus at said trailing end portion, an inflatable annular protective sheath at least partially disposed within said frusto-conical skin, said annular sheath being adapted to intimately surround at least a portion of a payload housed therein, means for connecting said paracanopy to an associated payload, duct means between said torus and said annular sheath for defining upon inflation thereof a fluidically rigidified frame, means for inflating said torus, annular sheath and duct means incident to vehicle reentry to fluidically rigidify said frame thereby maintaining said flexible skin in taut, though uninflated, condition and in progressively spaced relationship from said annular sheath between said leading and trailing end portions, said payload includes a body having leading and trail ends, another generally annular protective sheath generally surrounding said body generally entirely between said body leading and trailing ends, and means connecting said another annular protective sheath in intimate spaced relationship to an exterior surface of said payload body prior to liftoff whereby the payload body is thereby protected by said another annular protective sheath during both liftoff and reentry.

41. A paracanopy for decelerating/stabilizing space vehicles, boosters, astronauts, equipment and like payloads comprising a generally frusto-conical flexible uninflated skin defining a decelerator/stabilizer surface having relatively axially spaced leading and trailing end portions, said leading end portion being of a smaller diameter than said trailing end portion, an inflatable torus at said trailing end portion, an inflatable annular protective sheath at least partially disposed within said frusto-conical skin, said annular sheath being adapted to intimately surround at least a portion of a payload housed therein, means for connecting said paracanopy to an associated payload, duct means between said torus and said annular sheath for defining upon inflation thereof a fluidically rigidified frame, means for inflating said torus, annular sheath and duct means incident to vehicle reentry to fluidically rigidify said frame thereby maintaining said flexible skin in taut, though uninflated, condition and in pogressively spaced relationship from said annular sheath between said leading and trailing end portions, said payload includes a body having leading and trail ends, another, though uninflatable, generally annular protective sheath generally surrounding said body generally entirely between said body leading and trailing ends, and means connecting said another annular protective sheath in intimate spaced relationship to an exterior surface of said payload body prior to liftoff whereby the payload body is thereby protected by said another annular protective sheath during both liftoff and reentry.

42. A paracanopy for decelerating/stabilizing space vehicles, bossters, astronauts, equipment and like payloads comprising a generally frusto-conical flexible uninflated skin defining a decelerator/stabilizer surface having relatively axially spaced leading and trailing end portions, said leading end portion being of a smaller diameter than said trailing end portion, an inflatable torus at said trailing end portion, an inflatable annular protective sheath at least partially disposed within said frusto-conical skin, said annular sheath being adapted to intimately surround at least a portion of a payload housed therein, means for connecting said paracanopy to an associated payload, duct means between said torus and said annular sheath for defining upon inflation thereof a fluidically rigidified frame, means for inflating said torus, annular sheath and duct means incident to vehicle reentry to fluidically rigidify said frame thereby maintaining said flexible skin in taut, though uninflated, condition and in progressively spaced relationship from said annular sheath between said leading and trailing end portions, said payload includes a body having leading and trail ends, another generally annular protective sheath generally surrounding said body generally entirely between said body leading and trailing ends, means connecting said another annular protective sheath in intimate spaced relationship to an exterior surface of said payload body prior to liftoff whereby the payload body is thereby protected by said another annular protective sheath during both liftoff and reentry, and at least one access opening in said annular protective sheath at said body leading end for occupant viewing purposes.

43. A paracanopy for decelerating/stabilizing space vehicles, boosters, astronauts, equipment and like payloads comprising a generally frusto-conical flexible uninflated skin defining a decelerator/stabilizer surface having relatively axially spaced leading and trailing end portions, said leading end portion being of a smaller diameter than said trailing end portion, an inflatable torus at said trailing end portion, an inflatable annular protective sheath at least partially disposed within said frusto-conical skin, said annular sheath being adapted to intimately surround at least a portion of a payload housed therein, means for connecting said paracanopy to an associated payload, duct means between said torus and said annular sheath for defining upon inflation thereof a fluidically rigidified frame, means for inflating said torus, annular sheath and duct means incident to vehicle reentry to fluidically rigidify said frame thereby maintaining said flexible skin in taut, though uninflated, condition and in progressively spaced relationship from said annular sheath between said leading and trailing end portions, said payload includes a body having leading and trailing ends, said housing means being at said body trailing end, another generally annular inflatable protective sheath generally surrounding said body generally entirely between said body leading and trailing ends only after liftoff, another housing means at said body leading end for storing said another annular sheath therein in folded uninflated condition during payload liftoff, means for releasing said another annular sheath from said another housing means, and means for inflating said another annular sheath incident to payload reentry whereby said another annular sheath will deploy generally along the entire length of said body between said body trailing and leading ends to protect said body and its contents during reentry, and said inflated rigid frame and taut skin will decelerate/stabilizer said payload upon reentry.

44. A paracanopy for decelerating/stabilizing space vehicles, boosters, astronauts, equipment and like payloads comprising a generally frusto-conical flexible uninflated skin defining a decelerator/stabilizer surface having relatively axially spaced leading and trailing end portions, said leading end portion being of a smaller diameter than said trailing end portion, an inflatable torus at said trailing end portion, an inflatable annular protective sheath at least partially disposed within said frusto-conical skin, said annular sheath being adapted to intimately surround at least a portion of a payload housed therein, means for connecting said paracanopy to an associated payload, duct means between said torus and said annular sheath for defining upon inflation thereof a fluidically rigidified frame, means for inflating said torus, annular sheath and duct means incident to vehicle reentry to fluidically rigidify said frame thereby maintaining said flexible skin in taut, though uninflated, condition and in progressively spaced relationship from said annular sheath between said leading and trailing end portions, said payload includes a body having leading and trailing ends, said housing means being at said body trailing end, another generally annular inflatable protective sheath generally surrounding said body generally entirely between said body leading and trailing ends only after liftoff, second housing means at said body leading end for storing said another annular sheath therein in folded uninflated condition during payload liftoff, means for releasing said another annular sheath from said another housing means, and means for inflating said another annular sheath incident to payload reentry whereby said another annular sheath will deploy generally along the entire length of said body between said body trailing and leading ends to protect said body and its contacts during reentry, said inflated rigid frame and taut skin will decelerate said payload upon reentry, and means for maintaining said another protective surface of said payload body.

45. A space vehicle comprising a body having leading and trailing ends, housing means for storing a paracanopy in folded uninflated condition at said trailing end during vehicle liftoff, a generally annular protective sheath generally surrounding said body generally entirely between said body leading and trailing ends, means connecting said protective sheath in intimate spaced relationship to an exterior surface of said body prior to liftoff whereby the body is thereby protected by said protective sheath during both liftoff and reentry, means for deploying the paracanopy incident to reentry, said paracanopy including an inflatable frame and a flexible skin defining a deceleration/stabilization surface, means for connecting said inflatable frame to said housing means, and means for inflating said inflatable frame incident to vehicle reentry whereby said decelerator/stabilizer surface will decelerate vehicle reentry speed.

46. The space vehicle as defined in claim 45 including means for providing viewing opening in said protective sheath for vehicle occupant visibility.

47. The space vehicle as defined in claim 45 wherein said inflatable frame includes an annular sheath in exterior surrounding relationship to said trailing end.

48. A space vehicle comprising a body having leading and trailing ends, housing means at one of said body ends for storing a paracanopy in folded uninflated condition during vehicle liftoff, means for deploying said paracanopy including a generally frusto-conical flexible skin defining a decelerator/stabilizer surface having axially spaced leading and trailing end portions, said leading end portion being of a smaller diameter than said trailing end portion, an inflatable torus at said decelerator/stabilizer surface trailing end portion, an inflatable annular protective sheath disposed within said frustoconical skin, duct means between said torus and said annular sheath for defining upon inflation thereof a fluidically rigidified frame, means for fluidically inflating said torus, annular sheath and duct means incident to vehicle reentry to fluidically rigidify said frame and maintain said flexible skin in taut condition, said inflated annular sheath extending the length of said vehicle body between the leading and trailing ends thereof, and means between said annular sheath and an exterior surface of said vehicle body for maintaining said annular sheath and vehicle exterior surface in intimate spaced relationship.

49. The space vehicle as defined in claim 48 wherein said space maintaining means are a plurality of inflatable ducts.

50. The space vehicle as defined in claim 48 wherein said space maintaining means are a plurality of inflatable ducts extending along the axial length of said annular sheath.

51. The space vehicle as defined in claim 48 wherein said space maintaining means are a plurality of inflatable ducts extending along the axial length of said annular sheath and in circumferentially spaced relationship to each other.

52. The space vehicle as defined in claim 48 wherein said space maintaining means are a plurality of inflatable ducts, and said inflating means effect fluidic travel in axially opposite directions in said ducts and annular sheath.

53. The space vehicle as defined in claim 48 wherein said space maintaining means are a plurality of inflatable ducts extending along the axial length of said annular sheath, and said inflating means effect fluidic travel in axially opposite directions in said ducts and annular sheath.

54. The space vehicle as defined in claim 48 wherein said space maintaining means are a plurality of inflatable ducts extending along the axial length of said annular sheath and in circumferentially spaced relationship to each other, and said inflating means effect fluidic travel in axially opposite directions in said ducts and annular sheath.

55. The space vehicle as defined in claim 48 wherein said body is a manned capsule.

56. The space vehicle as defined in claim 48 wherein said body is an unmanned recoverable and reusable space vehicle.

57. The space vehicle as defined in claim 48 wherein said housing means is at said body leading end.

58. The space vehicle as defined in claim 48 wherein said housing means is at said body leading end, and said paracanopy is disposed between axially opposite ends of said annular sheath.

59. The space vehicle as defined in claim 48 including inflated attenuator means at said vehicle body leading end defining a portion of said annular sheath.

60. The space vehicle as defined in claim 48 including inflated buoyancy means at said vehicle body trailing end defining a portion of said annular sheath.

61. The space vehicle as defined in claim 48 including inflated attenuator means at said vehicle body leading end defining a portion of said annular sheath, and inflated buoyancy means at said vehicle body trailing end defining a portion of said annular sheath.

62. A space vehicle recovery system comprising a paracanopy deceleration/stabilization section and a buoyancy section, said paracanopy section including a generally frusto-conical flexible skin defining a decelerator/stabilizor surface having axially spaced leading and trailing end portions, said leading end portion being of a smaller diameter than said trailing end portion, an inflatable torus at said trailing end portion, an inflatable annular protective sheath within said frusto-conical skin, duct means between said torus and said annular sheath for defininig upon inflation thereof a fluidically rigidified frame, said buoyancy section being an inflatable member disposed at a side of said torus opposite said flexible skin, means for housing said sections, means for deploying said sections from said housing means, and means for inflating said torus, annular sheath, duct means and buoyancy member to effect water recovery of a space vehicle associated therewith.

63. The space vehicle recovery system as defined in claim 62 including an inflatable attenuator section remote from said inflatable buoyancy member, and said inflating means further inflates said attenuator section.

64. The space vehicle recovery system as defined in claim 62 wherein said buoyancy member is of an annular configuration.

65. The space vehicle recovery system as defined in claim 62 including inflatable spacing means for maintaining said inflated annular sheath in intimate spaced relationship to an exterior surface of an associated space vehicle, and said inflating means further inflates said spacing means.

66. The space vehicle recovery system as defined in claim 62 including another smaller diameter inflatable torus within an area set-off by said first-mentioned torus, and said duct means include fluid ducts between said first-mentioned torus and said smaller torus.

67. The space vehicle recovery system as defined in claim 62 including inflatable means carried by said torus for controlling turbulence along the exterior of said sections during reentry, and said inflating means further inflates said turbulence controlling means.

68. A paracanopy for decelerating space vehicles, boosters, astronauts, equipment and the like payloads comprising a generally frusto-conical flexible skin defining a decelerator surface having relatively axially spaced leading and trailing end portions, said leading end portion being of a smaller diameter than said trailing end portion, an inflatable torus at said trailing end portion, means for connecting said paracanopy to an associated payload, said inflatable torus including at least one internal wall dividing said inflatable torus into two independent annular torus chambers, and means for inflating said torus chambers incident to vehicle reentry to fulidically rigidify said torus thereby maintaining said flexible skin in taut condition.

69. The paracanopy as defined in claim 68 wherein said skin trailing edge is a continuation of said internal walls.

70. The paracanopy as defined in claim 68 wherein said skin trailing edge is connected to said internal wall.

* * * * *